(12) United States Patent
Chakravarthy et al.

(10) Patent No.: US 10,079,795 B2
(45) Date of Patent: Sep. 18, 2018

(54) UNIFIED MESSAGING LEVERAGING CONTACTS ACROSS EXISTING IDENTITIES WITHOUT COMPROMISING PRIVACY

(71) Applicants: Sriram Chakravarthy, Saratoga, CA (US); Madhav Vodnala, San Jose, CA (US); Ram Menon, Los Altos, CA (US)

(72) Inventors: Sriram Chakravarthy, Saratoga, CA (US); Madhav Vodnala, San Jose, CA (US); Ram Menon, Los Altos, CA (US)

(*) Notice: Subject to any disclaimer, the term of this patent is extended or adjusted under 35 U.S.C. 154(b) by 79 days.

(21) Appl. No.: 14/965,877

(22) Filed: Dec. 10, 2015

(65) Prior Publication Data
US 2016/0359794 A1 Dec. 8, 2016

Related U.S. Application Data

(60) Provisional application No. 62/091,624, filed on Dec. 14, 2014.

(51) Int. Cl.
*H04L 12/58* (2006.01)
*H04W 4/14* (2009.01)

(52) U.S. Cl.
CPC .............. *H04L 51/36* (2013.01); *H04L 51/04* (2013.01); *H04L 51/22* (2013.01); *H04W 4/14* (2013.01)

(58) Field of Classification Search
CPC ....... H04W 4/14; H04W 4/046; H04W 4/008; H04W 4/12; H04M 1/72577; H04M 1/6091; H04M 2250/10; H04L 67/12
See application file for complete search history.

(56) References Cited

U.S. PATENT DOCUMENTS

| | | | |
|---|---|---|---|
| 8,345,600 B2* | 1/2013 | Chang ................ | G06F 9/4443 370/328 |
| 8,363,644 B2* | 1/2013 | Kreitzberg ............ | H04L 67/24 370/352 |

(Continued)

OTHER PUBLICATIONS

Sarah Jacobsson Purewal, "How to Use Skype for Voice and Video Chat on Your Android/iOS Device", Oct. 27, 2011, http://www.pcworld.com/article/242716/how_to_use_skype_for_voice_and_video_chat_on_your_android_ios_device.html.*

(Continued)

*Primary Examiner* — Ninos Donabed

(57) ABSTRACT

In one embodiment, a method of establishing a universal intercommunication connection between two users includes, executing on one or more processors the step of receiving a request from a first user to establish a universal intercommunication connection with a second user. The method includes providing an instance of a universal communication application to a first user's computing device. The method includes providing another instance of the universal communication application to a second user's computing device. The method includes verifying that the first user and the second user have at least one connection. The method includes establishing an intercommunication connection between the first user's computing device and the second user's computing device. The universal communication applications enable the first user and the second user to communicate via instant message, text message and cellular call with an established intercommunication connection.

1 Claim, 5 Drawing Sheets

(56) References Cited

U.S. PATENT DOCUMENTS

| | | | | |
|---|---|---|---|---|
| 8,509,186 B2* | 8/2013 | Oerton | ............... | H04M 1/2535 |
| | | | | 370/328 |
| 8,571,587 B2* | 10/2013 | Jagoe | ............... | H04L 12/1818 |
| | | | | 455/415 |
| 8,789,094 B1* | 7/2014 | Singh | ............... | G06F 3/00 |
| | | | | 348/14.01 |
| 9,167,035 B2* | 10/2015 | Kaal | ............... | H04L 67/104 |
| 9,398,048 B2* | 7/2016 | Hawrylyshen | ............... | H04L 63/08 |
| 9,449,614 B2* | 9/2016 | Vos | ............... | G10L 19/012 |
| 9,584,563 B2* | 2/2017 | Partaker | ............... | H04M 3/42076 |
| 9,681,095 B2* | 6/2017 | Krishnamoorthy | ............... | H04N 7/141 |
| 2008/0281794 A1* | 11/2008 | Mathur | ............... | G06F 17/3089 |
| 2010/0069148 A1* | 3/2010 | Cargill | ............... | A63B 71/0622 |
| | | | | 463/25 |
| 2010/0260191 A1* | 10/2010 | Hiie | ............... | H04L 12/1827 |
| | | | | 370/400 |
| 2011/0086712 A1* | 4/2011 | Cargill | ............... | A63B 71/0622 |
| | | | | 463/42 |
| 2011/0243125 A1* | 10/2011 | Kaal | ............... | H04M 1/7253 |
| | | | | 370/352 |
| 2012/0087367 A1* | 4/2012 | Anikin | ............... | G06Q 10/10 |
| | | | | 370/352 |
| 2012/0089727 A1* | 4/2012 | Raleigh | ............... | H04L 12/14 |
| | | | | 709/224 |
| 2013/0170361 A1* | 7/2013 | Manyakin, Jr. | ... | H04L 29/06176 |
| | | | | 370/241 |
| 2013/0344859 A1* | 12/2013 | Abramson | ............... | G06Q 50/265 |
| | | | | 455/418 |
| 2014/0108382 A1* | 4/2014 | Garg | ............... | G06F 17/30038 |
| | | | | 707/722 |
| 2014/0372743 A1* | 12/2014 | Rogers | ............... | H04L 9/3234 |
| | | | | 713/2 |
| 2016/0285791 A1* | 9/2016 | Teng | ............... | H04L 51/04 |
| 2017/0105097 A1* | 4/2017 | Babaian | ............... | H04W 4/023 |
| 2017/0149707 A1* | 5/2017 | Hattar | ............... | H04L 51/066 |

OTHER PUBLICATIONS

Using Skype on your iPhone and /or Ipad, Aug. 2012, Visual Steps.*

* cited by examiner

UNIFIED MESSAGING LEVERAGING CONTACTS ACROSS EXISTING IDENTITIES WITHOUT COMPROMISING PRIVACY

CROSS-REFERENCE TO RELATED APPLICATIONS

This application hereby incorporates by reference the following applications in their entirety: U.S. Provisional Patent Application No. 62/091,624, titled UNIFIED MESSAGING LEVERAGING CONTACTS ACROSS EXISTING IDENTITIES WITHOUT COMPROMISING PRIVACY and filed on 14 Dec. 2014.

BACKGROUND OF THE INVENTION

1. Field

This application relates generally electronic communication, and more particularly to a system and method of unified messaging leveraging contacts across existing identities without compromising privacy.

2. Related Art

Users are often assigned corporate email accounts, cell phone numbers, etc. during their tenure at a company. The user can create a list of contacts. The contacts may use the corporate email accounts, cell phone numbers, etc. as the means of contacting the user. Consequently, when the user leaves the corporation, many of the contacts may be lost to the user. Similar issues exist in university and other institutional settings. Past employers and other institutions may not be willing to give users access to the lost contacts. Thus, a method and system are desired for a system and method of unified messaging leveraging contacts across existing identities without compromising privacy.

BRIEF SUMMARY OF THE INVENTION

In one embodiment, a method of establishing a universal intercommunication connection between two users includes, executing on one or more processors the step of receiving a request from a first user to establish a universal intercommunication connection with a second user. The method includes providing an instance of a universal communication application to a first user's computing device. The method includes providing another instance of the universal communication application to a second user's computing device. The method includes verifying that the first user and the second user have at least one connection. The method includes establishing an intercommunication connection between the first user's computing device and the second user's computing device. The universal communication applications enable the first user and the second user to communicate via instant message, text message and cellular call with an established intercommunication connection.

Figure 1:
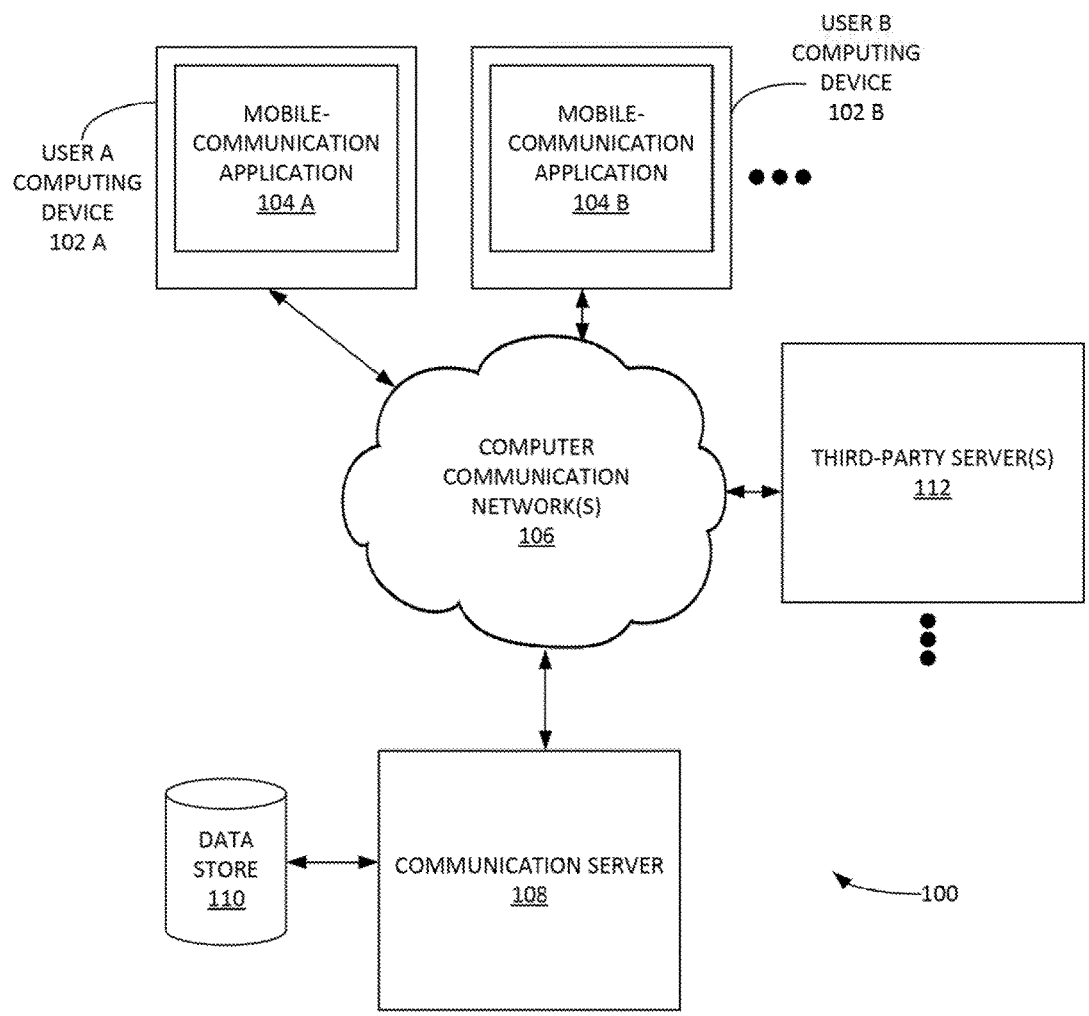
FIG. 1 illustrates an example system for implementing a universal communication application, according to some embodiments.

The Figures described above are a representative set, and are not an exhaustive with respect to embodying the invention.

DESCRIPTION

Disclosed are a system, method, and article of manufacture of unified messaging leveraging contacts across existing identities without compromising privacy. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, ail refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the Definitions External Short Messaging Entity (ESME) is art external application that connects to a Short Message Service Center (SMSC) to engage in the sending and/or receiving of SMS messages.

Instant messaging (IM) is a type of chat which offers real-time text transmission over a computer network such as the Internet.

Mobile application (e.g. a mobile app) mobile app is a computer program designed to run on smartphones, tablet computers and other mobile devices.

Telephony can involve the development, application, and deployment of telecommunication services for the purpose of electronic transmission of voice, fax, or data, between distant parties.

Exemplary Computer Architecture and Systems

FIG. 1 illustrates an example system 100 for implementing a universal communication application and/or system, according to some embodiments. System 100 can include one or more user-side computing devices 102 A-B. Computing devices 102 A-B can be mobile devices (e.g. smart phones, tablet computers, wearable computing devices, head-mounted display devices, etc.). Computing devices 102 A-B can include mobile-communication applications 104 A-B. Computing devices 102 A-B can include web browsers.

Mobile-communication applications 104 A-B can be utilized by a user to communicate with another user via various communication protocols. Example communication protocols that can be implemented by mobile-communication applications 104 A-B include, inter alia: electronic mail (email), text messaging (e.g. SMS, MMS, etc.), telephony (e.g. cellular telephony. Voice over IP (VoIP), teleconferencing, etc.), IM, video chat, etc. Mobile-communication applications 104 A-B can access the operating system of the respective computing devices 102 A-B in which they are installed. Mobile-communication applications 104 A-B can obtain various identification information such as a telephone number, email address, social networking identifiers, chat aliases, and the like. Mobile-communication applications 104 A-B can include an in-application messaging system that enables a user to communicate with another user with the mobile-communication application.

A first user of computing device 102 A can use mobile-communication applications 104 A to communicate an invitation to a second user of computing device 102 B can use mobile-communication applications 104 B. Mobile-communication applications 104 A-B can be used to verify a user's identity (e.g. with the unique telephone number of the user's mobile device, etc.). For example, mobile-communication applications 104 A-B can provide IM services between the two users of computing devices 102 A-B respectively. Enablement of the IM service (and/or other communication service) can be based on whether the two users have other a priori connections. These a priori connections can be controlled by a set of rules managed by communication server 108. An a priori connection can be a social networking and/or other communication connection formed before a request to enable a communication server between the two users is initiated.

Communication server 108 can manage the invitation process and/or inter-application communication process. Communication server 108 can verify user identities. Communication server 108 can verify prior connections between two or more users. For example, communication server 108 can request that a third-party entity/server (e.g. Facebook®, Linked®, Twitter®, etc.) verify an explicit social connection between two users on its respective online social network. These requests can be generated based on the various protocols and/or API's provided by the respective third-party entities/servers. Once an a priori connection and user identifies are verified, communication server 106 can enable one or more communication protocols between the users. Communication server 108 can include various communication servers and/or processes (e.g. text messaging, ESME, SMSC, telephony servers, email servers, IM servers, etc.).

In some embodiments, established communication protocols between users can be dependent on the maintenance of the a priori connection and/or other factors (e.g. that a user maintains an email account used to verify the user's identify, etc.). For example, a Linkedin® connection is dropped by a first user. The Linkedin® connection may have been used as the a priori connection between the first user and a second user. Accordingly, the communication server 108 can discontinue access to the communication protocol between the first and the second user, in another example, a corporate email account may have been used by the first user to verify the first user's identity to establish the communication protocol between the first and the second user. The first user may no longer be employed by the corporation. The corporation can notify the communication server 106. The communication server 106 can then discontinue access to the communication protocol between the first and the second user. It is noted that in some examples, a communication connection can be between more than two users (e.g. many-to-many, one-to-many, etc.).

Computer communication networks 106 can be a data network (e.g. a telecommunications network) that allows computers to exchange data. Computer communication networks 106 can be a TCP/IP network such as the Internet. Computer communication networks 106 can be wide area networks, enterprise private networks, virtual private network, cellular data networks, local area networks, etc.

Figure 2:
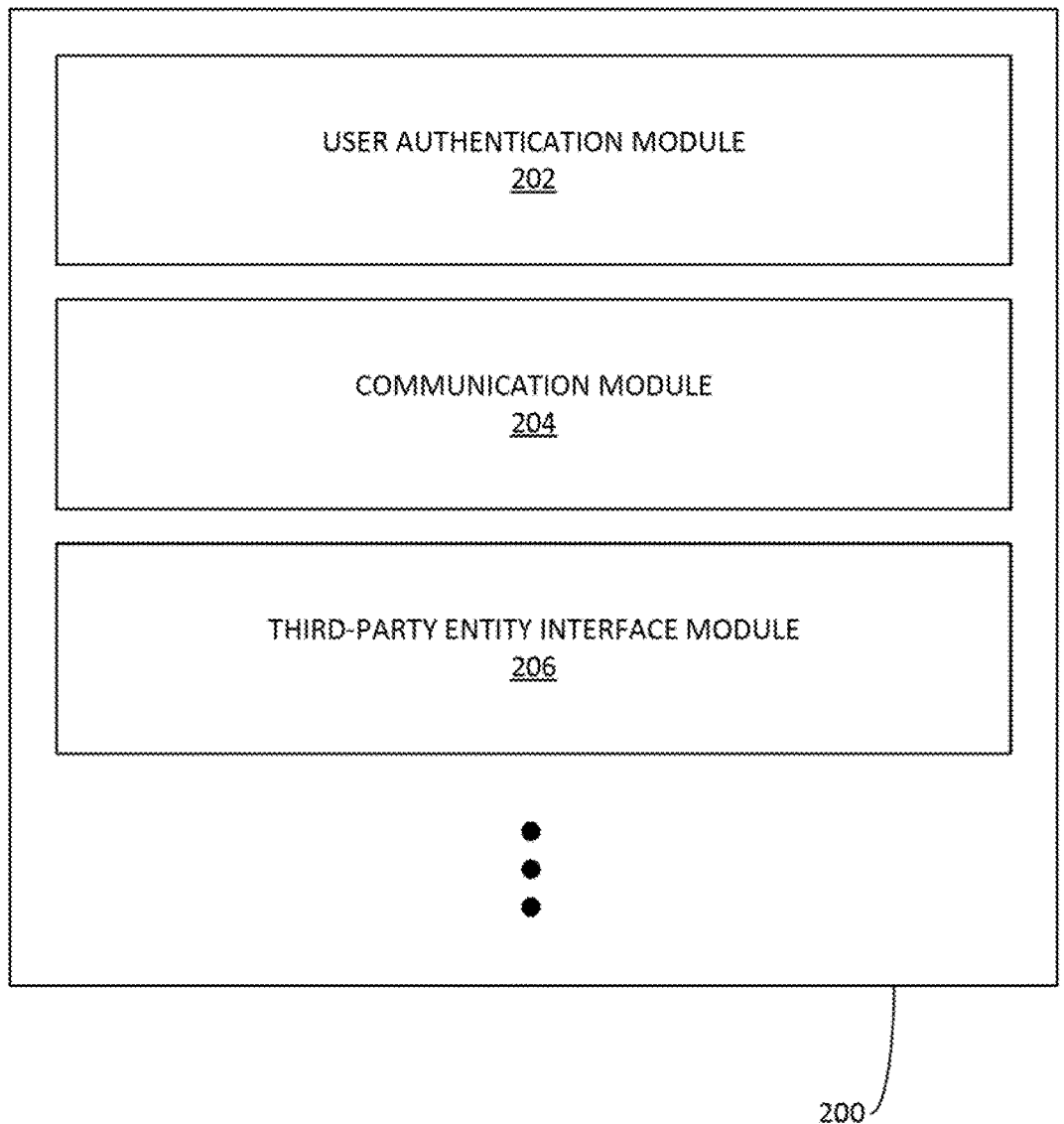
FIG. 2 illustrates an example communication server, according to some embodiments.

FIG. 2 illustrates an example communication server 200, according to some embodiments. Communication server 200 can provide bi-directional communication between any two or more users regardless of the identity of the users. Communication server 200 can include a user identification module 202. User identification module 202 can utilize various user-authentication methods to authenticate a user (e.g. multifactor authentication). User identification module 202 can authenticate a user with a user's telephone number. User identification module 202 can obtain the telephone number from user input and/or by accessing an operating system of a mobile device via a mobile application installed in the mobile device. User identification module 202 can verify that users have at least one a priori connection (e.g. a social network connection).

Communications module 204 can enable intercommunication between two or more mobile devices that include a mobile-communication application, intercommunication that can be implemented include, inter alia: voice and/or instant messaging communication protocols, etc. The inter-communication aspect can enable two or more mobile devices to establish telephone or conferencing calls between them. Furthermore, communications module 204 can include functionalities for various telephony-related services such as, inter alia: answering machine functions, automatic call accounting, caller ID, remote supervision of the entire system, selection of signaling sounds, speed dialing, station-specific limitations (such as no long distance access or no paging), etc. Communications module 204 can parse intercommunication between mobile-communication applications based a source of the intercommunication relationship. For example, an intercommunication relationship between two users can be based on the corporate employee identity of one user, in this case, the employee may have used a corporate communication protocol, such as a corporate email, as an identifier. The employees other intercommunication relationships can be based on personal connections (e.g. a Linkedin® or Facebook® connection). When the intercommunication relationship is based on a corporate identity, communication module 204 can provide control over the intercommunication relationship to a corporate administrator. The corporate administrator can receive reports on communications and/or block the intercommunication relationship (e.g. using a dashboard provided by the communications server 200).

In one example, communications module 204 can include/manage an SMSC and/or other text messaging management system. In one example, communications module 204 can include/manage an IM server. Although, it is noted that in some examples, IM services can be peer-to-peer (direct point-to-point transmission) in lieu of a client-server IM system. In the peer-to-peer IM example, an IM application can be included in the mobile-communication application can manage IM, while communications module 204 can supervise permissions/authorizations of IM connections between users.

Communication server 200 can include a third-party entity interface module 206. Third-party entity interface module 206 can interface with various third-party entities (e.g. third-party entity servers 112 of FIG. 1). Third-party entity interface module 206 obtain user connection information (e.g. explicit social network connections). Connection information can be utilized to verify an a priori connection between two or more users. For example, third-party entity interface module 206 verify that two users follow each other on a microblog service such as Twitter®. In another example, third-party entity interface module 206 can verify that two users are explicitly connected on Facebook®, Linkedin® and/or another online social network. Third-party entity interface module 206 query an API of the third-party entity to obtain said connection information. Third-party entity interface module 206 update a database of mobile-communication application users to indicate users with verified connections. Third-party entity interface module 206 can also interface with a corporate entity to receive instructions as to which users have permission to engage in intercommunications as a representative of said corporation.

Communication server 200 can further include additional functionalities not shown. Example functionalities include, inter alia, billing services, registration services, corporate administration dashboards, etc. it is further noted communications server 200 can be implemented in a cloud-computing platform in whole or in part.

Figure 3:
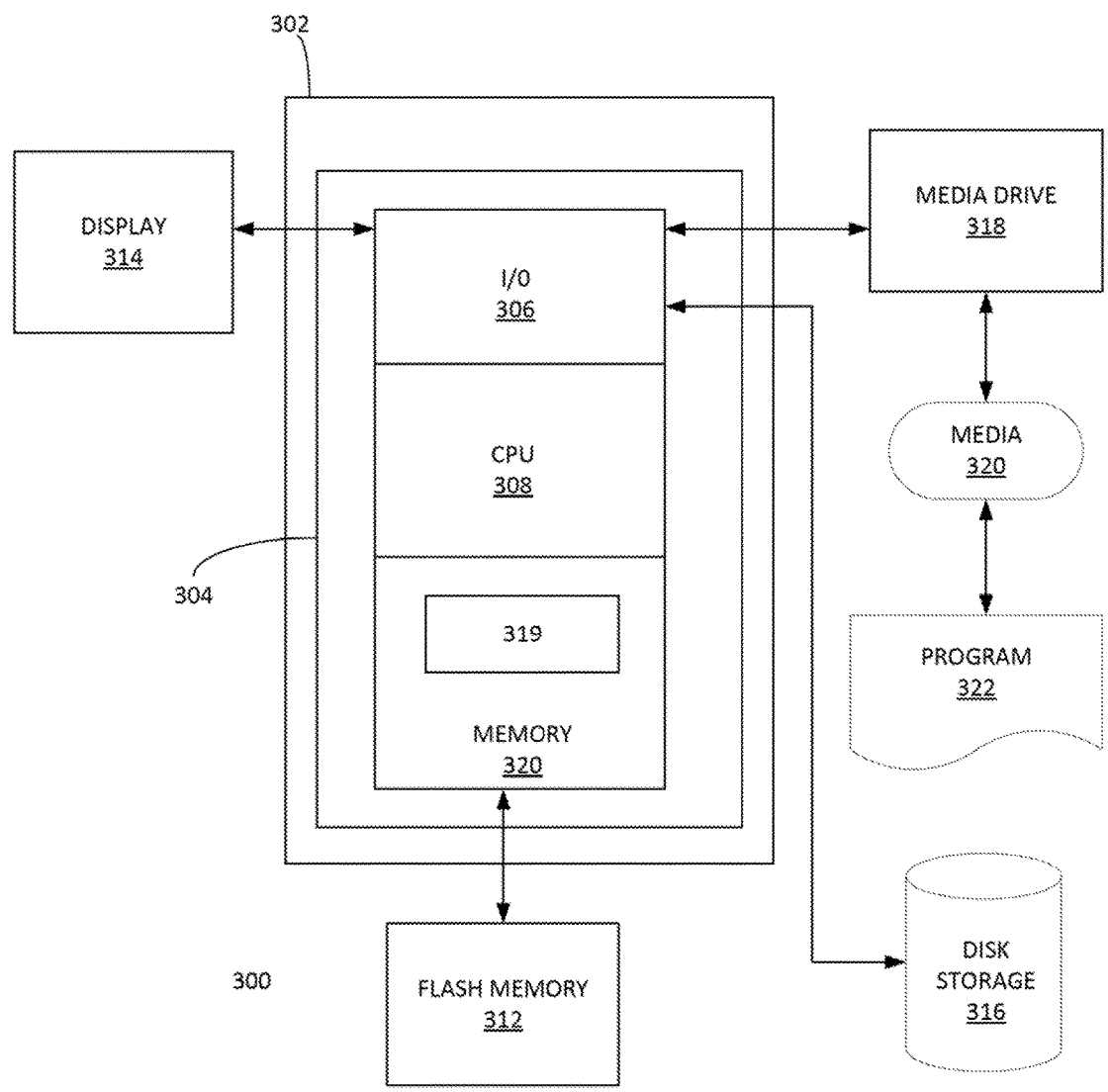
FIG. 3 depicts an exemplary computing system that can be configured to perform any one of the processes provided herein.

FIG. 3 depicts an exemplary computing system 300 that can be configured to perform any one of the processes provided herein, in this context, computing system 300 may include, for example, a processor, memory, storage, and I/O devices (e.g., monitor, keyboard, disk drive, internet connection, etc.). However, computing system 300 may include circuitry or other specialized hardware for carrying out some or all aspects of the processes, in some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a memory section 310, which may have a flash memory card 312 related to it. The I/O section 308 can be connected to a display 314, a keyboard and/or other user input (not shown), a disk storage unit 316, and a media drive unit 318. The media drive unit 318 can read/write a computer-readable medium 320, which can contain programs 322 and/or data. Computing system 300 can include a web browser. Moreover, it is noted that computing system 300 can be configured to include additional systems in order to fulfill various functionalities. Computing system 300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc, in one example, computing system 300 can be a mobile device and include a module 319 that includes a mobile-communications application, in another example, computing system 300 can be a server system and include a module 319 that includes a communications server.

Figure 4:
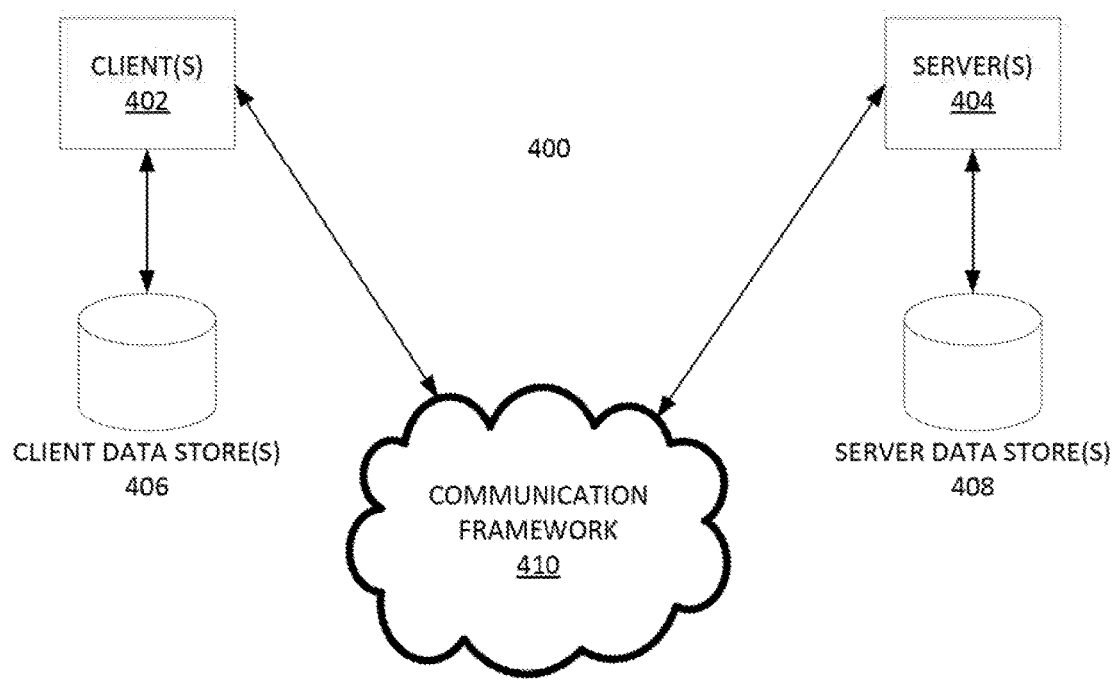
FIG. 4 illustrates another block diagram of a sample computing environment with which embodiments may interact.

FIG. 4 illustrates another block diagram of a sample computing environment 400 with which embodiments may interact. The system 400 further illustrates a system that includes one or more clients 402. The clients) 402 may be hardware and/or software (e.g., threads, processes, computing devices). The system 400 also includes one or more servers 404. The server(s) 404 may also be hardware and/or software (e.g., threads, processes, computing devices). One possible communication between a client 402 and a server 404 may be in the form of a data packet adapted to be transmitted between two or more computer processes. The system 400 includes a communication framework 410 that may be employed to facilitate communications between the client(s) 402 and the server(s) 404. The client(s) 402 are connected to one or more client data stores 406 that may be employed to store information local to the client(s) 402. Similarly, the server(s) 404 are connected to one or more server data stores 408 that may be employed to store information local to the server(s) 404.

Exemplary Methods

Figure 5:
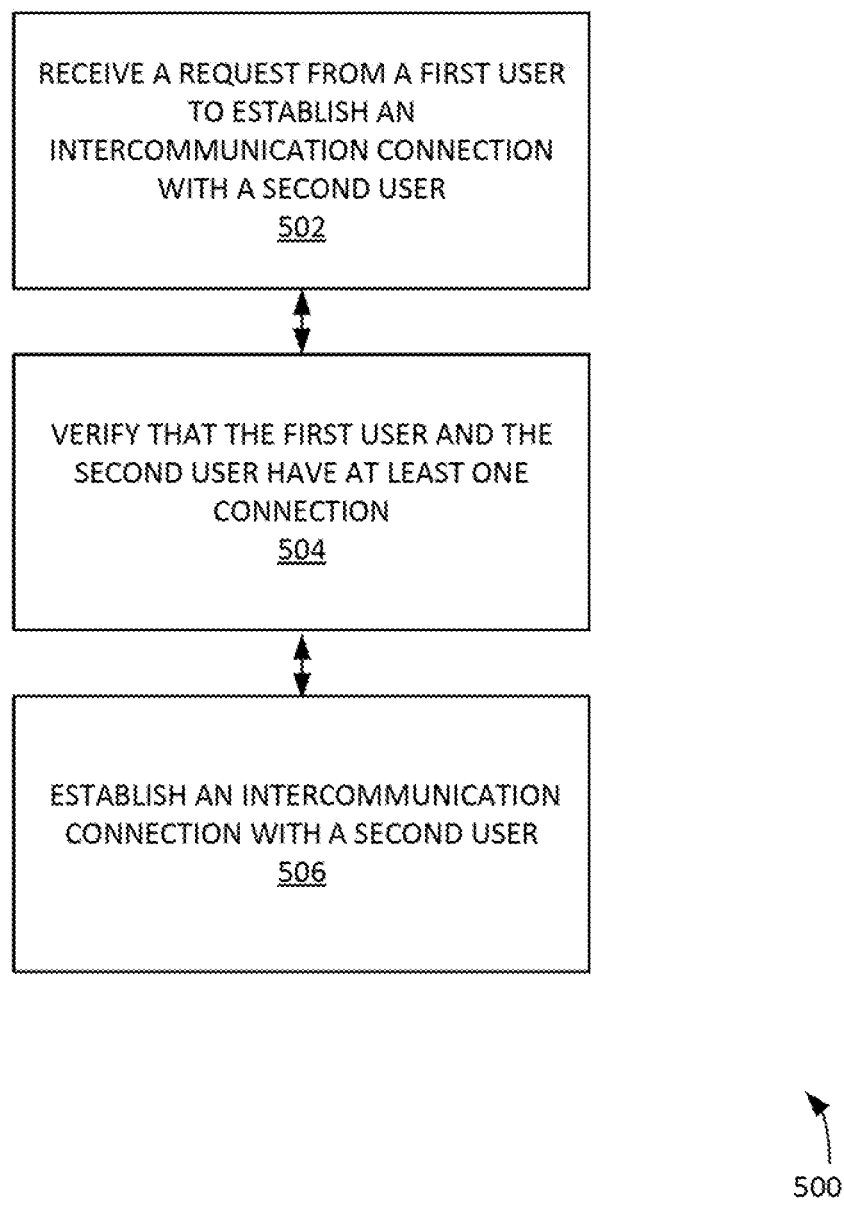
FIG. 5 illustrates an example process for establishing a universal intercommunication connections between two users, according to some embodiments.

FIG. 5 illustrates art example process 500 for establishing a universal intercommunication connections between two users, according to some embodiments, in step 502 of process 500, a request from a first user to establish an intercommunication connection with a second user is received. For example, the first and second users can have mobile devices that include mobile-communication applications. The mobile-communication applications can enable users to IM, text, make telephone calls, etc. with others users with an established intercommunication connection.

In step 504, it can be verified that the first user and the second user have at least one connection. The connection can be an a priori connection such as an established online social networking connection, an employment connection or the like. In one example, a connection can be made between a first user and a second user. For example, the first user can, inter alia: have the phone number of a second user in his address book, have the second user's email address, be connected with the second user's on LinkedIn®, be a follower of the second user on Twitter® and/or other microblogging service, have an explicit connection with the second user on an online social network (e.g. Facebook®, etc.), etc. Verification can be performed by a computerized process that queries an entity that manages the connection and/or review an available list of a user's online social networking connections (e.g. via the user's Facebook® or LinkedIn® page). In another example, a user may be requested to verify a unique identifier (e.g. a telephone number) and/or a corporate identifier (e.g. a corporate email account) in order to verify the connection.

In step 506, an intercommunication connection with a second user can be established. For example, the users can have mobile-communication applications in their respective smart phones. Mobile-communication applications can enable the users to communicate with other users with whom the users have a verified connection. For example, the users can use the mobile-communication applications to IM or implement telephone calls.

The systems of FIGS. 1-4 can be used to implement the systems, models and/or processes of FIG. 5 and/or other methods provided herein, according to various embodiments. The systems of FIGS. 3-5 can be used to implement the use cases discussed herein as well, it is further noted, that in some examples, a computing device such a laptop and/or a personal computer can be utilized in lieu of a mobile device.

Exemplary Use Cases

In one example, two users can be connected on Linkedin®. The users can download a mobile-communication application into their respective mobile devices. A first user can request that a universal communication system provide an intercommunication connection between the two users. The first user can provide evidence that the first user and the second user are connected on Linkedin®. The universal communication system can verify that the two users are connected on Linkedin®. The universal communication system can establish an intercommunication connection between the two users. For example, the two users can utilize an IM functionality in the mobile-communication applications to communicate. The universal communication system can establish and maintain other communication protocols (such as text messaging, email, voice telephony, video chat, etc.) with the mobile-communication applications. The users can choose to share private communication identifiers (e.g. cell phone numbers, personal email addresses, etc.). The universal communication system can utilize private communication identifiers in a multifactorial authentication process to authenticate that the users of the mobile devices are also the users connected on Linkedin®.

In one example, two or more users may only share a LinkedIn® connection and no other information (e.g. phone or email address). Accordingly, first user can only establish a connection with a second or more users via their common LinkedIn® association. Based on the common LinkedIn® associations, the first user can propose to the second or more users to communicate via a universal communication system. The second or more users can then decide to share other contact information and/or completely block the first user from accessing any other contact information even when the connection has been established via the universal communication system.

In another example, a user can work for a corporation. The user can utilized his personal mobile device and mobile-device application for corporate and personal communications. The universal communication system can utilize the user's corporate email address to authenticate the user to establish corporate-related intercommunication connections. The user's personal intercommunication connections can be established by other means. The corporation can monitor and/or otherwise manage the user's corporate-related intercommunication connections. For example, in the event the user is no longer employed with the corporation, the corporation can request that the universal communication system suspend the set of intercommunication connections established with the corporate email. The universal communication system can suspend said intercommunication connections. Accordingly, the user will not be able to further utilize the corporate-related intercommunication connections. However, the user will still be able to utilize the non-corporate-related intercommunication connections.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

An example of environment capturing is now provided. An additional benefit of doing the visual analysis of the pages would be the fact that we can also record the ad environment in which it's tested. For example, if the area where the ad is tested had black background and white text, we can record this fact, and utilize them when we create ads for testing. In this specific case, the ad which will be created can be with black background and white text (blending in) or white background and black text (contrast).

What is claimed as new and desired to be protected by Letters Patent of the United States is:

1. A method useful for implementing unified electronic messaging service by leveraging contacts across existing electronic messaging identities without compromising privacy comprising executing on one or more processors the steps of:

receiving a request from a first user to establish a universal communication server-based intercommunication connection with a second user, and wherein the second user is a business contact of the first user;

installing an instance of a universal communication application to a first user's computing device, wherein the first user's computing device comprises a first mobile device that includes the instance of the universal communication application;

installing another instance of the universal communication application to a second user's computing device, wherein the second user's computing device comprises a second mobile device that includes the other instance of the universal communication application;

verifying, with the communications server, that the identity of first user and the second user have an a priori connection by:

requesting, via the instance of the universal communication application operating in the first user's mobile device, to verify a unique identifier, wherein the unique identifier comprises a telephone number of the first user's mobile device and a corporate unique identifier, wherein the corporate unique identifier comprises a corporate email account of the first user that has been used by the first user to verify the first user's identity to establish the communication protocol between the first and the second user, and wherein the unique identifier comprises a phone number of the first user's mobile device;

querying an entity that manages the connection for a list of a first user's online social networking connections and the second user's online social networking connections; and verifying the a priori connection with the unique identifier and the corporate unique identifier, wherein the a priori connection comprises a priori electronic communication connection between the first user and the second user that was formed before the request was initiated using another electronic communication platform, and an established online social networking connection between the first user and second user that was formed before the request was initiated, and an employment-related connection that was formed before the request was initiated; and establishing, in the communications server, an intercommunication connection between the first user's computing device and the second user's computing device, wherein the universal communication applications enable the first user and the second user to communicate via instant message, text message and cellular call with an established intercommunication connection.

* * * * *